United States Patent [19]

Maeda

[11] Patent Number: 4,922,864
[45] Date of Patent: May 8, 1990

[54] SYSTEM FOR CONTROLLING AIR INTAKE FOR AN AUTOMOTIVE ENGINE

[75] Inventor: Satoshi Maeda, Tokyo, Japan

[73] Assignee: Fuji Jukogyo Kabushiki Kaisha, Tokyo, Japan

[21] Appl. No.: 378,906

[22] Filed: Jul. 12, 1989

[30] Foreign Application Priority Data

Jul. 19, 1988 [JP] Japan .................. 63-180632
Sep. 5, 1988 [JP] Japan .................. 63-223307

[51] Int. Cl.$^5$ .................................. F02M 35/10
[52] U.S. Cl. ..................... 123/52 M; 123/52 MV
[58] Field of Search ......... 123/52 M, 52 MB, 52 MV, 123/52 MC, 432

[56] References Cited

U.S. PATENT DOCUMENTS 4,704,996 11/1987 Morikawa ................ 123/52 M
4,766,853 8/1988 Iwanami ................... 123/52 M

FOREIGN PATENT DOCUMENTS 0110765 7/1982 Japan ...................... 123/52 M
2202276 9/1988 United Kingdom ........ 123/52 M

*Primary Examiner*—David A. Okonsky
*Attorney, Agent, or Firm*—Beveridge, DeGrandi & Weilacher

[57] ABSTRACT

An improved system for controlling air intake for an engine of a vehicle. Each curved intake manifold includes high speed intake passages having a larger diameter and a shorter length and low speed intake passages having a smaller diameter and a longer distance. Valves are disposed between a chamber and the high speed intake passages on the both banks. To open or close the valves in dependency on the engine speed, an actuator including a negative pressure chamber is installed on the chamber. The actuator is controlled by a crank angle sensor detecting the engine speed.

7 Claims, 8 Drawing Sheets

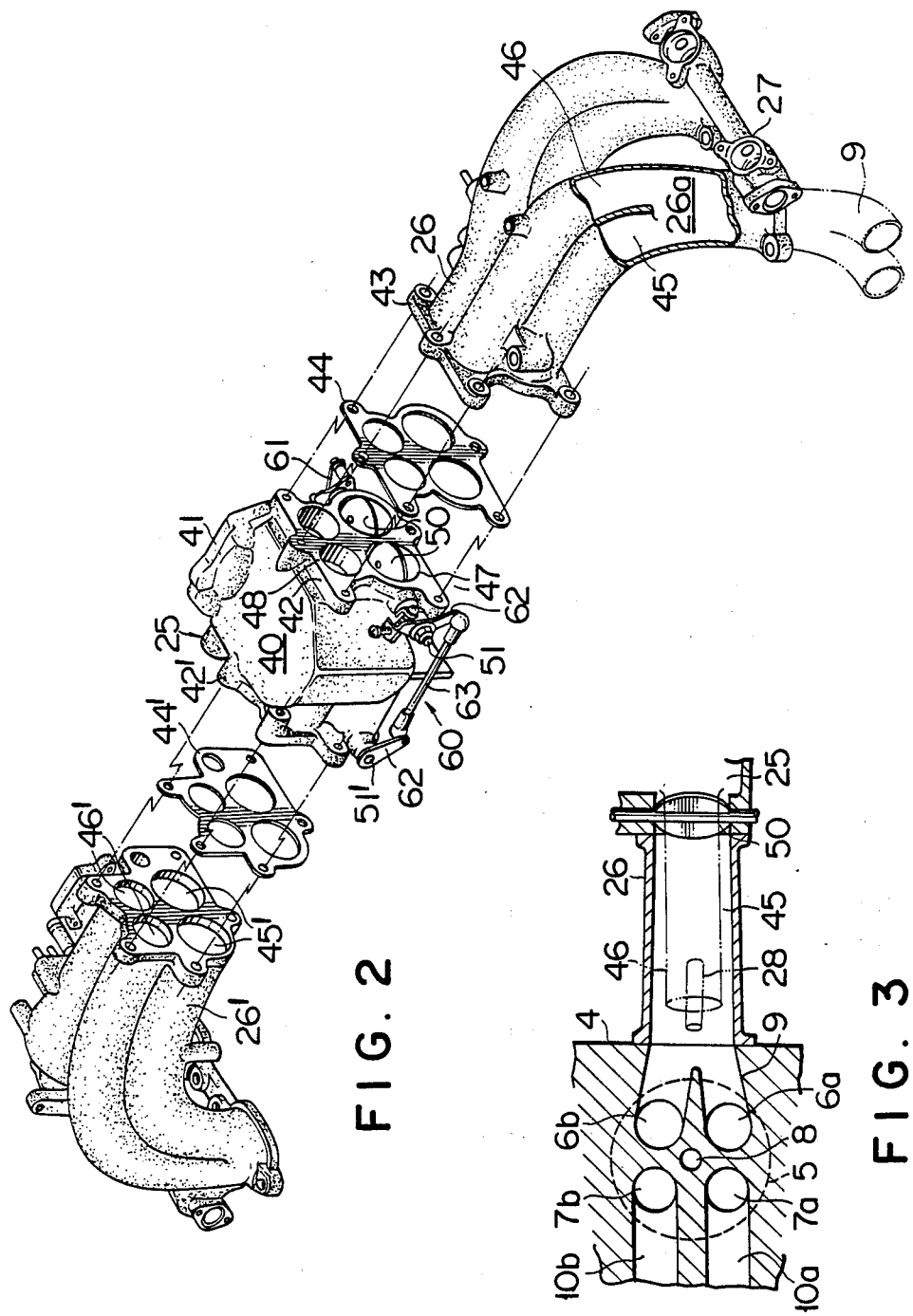

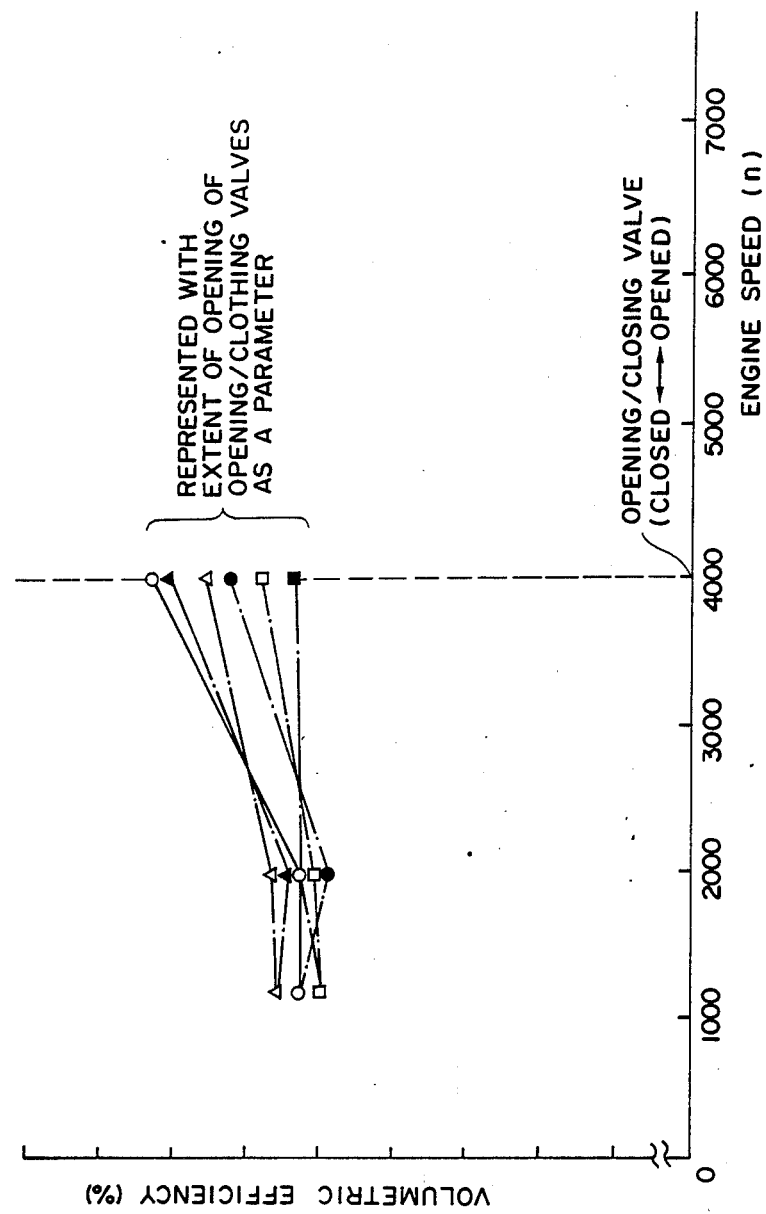

SYSTEM FOR CONTROLLING AIR INTAKE FOR AN AUTOMOTIVE ENGINE

BACKGROUND OF THE INVENTION

1. Technical Field

The present invention relates to a system for controlling air intake for an automotive engine and more particularly, to an improvement of controlling air intake for an horizontally-opposed type engine or a V-shaped engine which has two banks, i.e., a left-hand bank and a right-hand bank to provide two intake systems.

2. Description of the Relates Art

In recent years, an engine mounted on a vehicle is equipped in its intake system with an apparatus for controlling an air intake in order to assure that a high intake efficiency is maintained in a wide range from a lower speed range to a higher speed range. With such an apparatus, an intake inertia effect and a swirl effect are created by using a small diameter and long intake passage when the engine is operated at a low or intermediate speed with a small quantity of the intake air induced thereinto, whereby an intake efficiency and a combustion characteristic are improved. When the engine is operated at a high speed, the apparatus operates to feed a large quantity of air by a large diameter and short intake passage which has reduced resistance against air introduction so that an engine output is increased. To fully achieve an advantageous effect of the apparatus, the latter is often employed for a two intake valve type engine.

With respect to the former type of the apparatus for variably controlling the air intake, a typical one is disclosed in Japanese Laid-Open Pat. No. 224,933/1985 which is incorporated therein for reference. The apparatus includes two intake ports which are communicated with high speed intake passages and another intake port which is communicated with a low speed intake passage. Each of the high speed intake passages is provided with a valve at a position located in the proximity of the intake port so as to allow it to be closed in a low rotational speed range and opened in a high rotational speed range with controlling means.

With the conventional apparatus as mentioned above, the valves for the high speed intake passages are arranged near to an engine housing. Accordingly, it is preferable for a vertical type engine but it is not suitable for a horizontally opposed type engine. In case of the horizontally opposed type engine, a cylinder head is designed to have two banks which are a left-hand bank and a right-hand bank. This gives a rise for attaching an actuator to each bank when the valves are disposed in the same manner as the prior art. In case where the apparatus is operated by a single actuator, it is necessary that the valves on both the banks are operatively connected to each other using a long rod, cable or the like. This causes the apparatus to become complicated in structure. Moreover, it becomes difficult to operate the apparatus smoothly.

Other problems with the conventional apparatus are that when the engine is operated in the low or intermediate rotational speed range with the valves in the high speed intake passages kept closed, a more quantity of air is induced into one intake port via the low speed intake passage while the other intake port is fed with less quantity of air, and a volumetric efficiency is reduced due to a resistance against air induction in the flow passage.

Further, another problem is that torque decreases when the valves in the high speed intake passages are opened at the high rotational speed. In this case, a characteristic curve representative of variation of an engine torque does not show a smooth one.

SUMMARY OF THE INVENTION

The present invention provides a system for controlling an air intake in an engine for a vehicle, wherein air is uniformly induced into both intake ports with reduced resistance against air induction in flow passages.

Other object of the present invention is to provide a system for controlling the air intake for the engine for the vehicle, wherein no torque-down occurs when valves in high speed intake passages are shifted from an opened state to a closed state and vice versa.

To accomplish the above objects, the present provides a system for controlling air intake for an engine for a vehicle wherein a cylinder head has two banks, i.e., a left-hand bank and a right-hand bank and a chamber is arranged downstream of a throttle valve at a substantially intermediate position between the both banks so that it is communicated with respective cylinders on the both banks via intake manifolds extending from left and right sides of the chamber to intake ports of the cylinders, the intake manifolds being curved at right angles between a vertical plane and a horizontal plane, the improvement comprising high speed intake passages each situated on the inner peripheral side of the curved intake manifold and having a larger diameter and a shorter length and low speed intake passages each situated on the outer peripheral side of the same and having a smaller diameter and a longer distance, a joint chamber in which the high speed intake passages and the low speed intake passages are jointed to each other, valves disposed at portions between the chamber and the high speed intake passages, and an actuator attached to the chamber to be operatively connected to the valves via a valve actuating mechanism so as to open or close the valves to be opened or closed in dependency on the number of revolutions of an engine representing a current operational state of the engine.

According to other aspect of the present invention, the improvement comprises high speed intake passage each situated on the inner peripheral side of the curved intake manifold and having a larger diameter and a shorter length and low speed intake passages each situated on the outer peripheral side of the same and having a smaller diameter and a longer distance, a joint chamber in which the high speed intake passages and the low speed intake passages are jointed to each other, intake ports at the ends of intake manifold portions bifurcated from the joint chamber, the intake ports being arranged one after another along the longitudinal direction of the engine in correspondence to the intake ports on the cylinders, valves disposed in communication portions between the chamber and the high speed intake passages, and an actuator attached to the chamber to be operatively connected to the valves via a valve actuating mechanism so as to open or close the valves in dependency on the number of revolutions of the engine representing the current operational state of the engine.

According to another aspect of the present invention, the improvement comprises high speed intake passages each situated on the inner peripheral side of the curved intake manifold and having a larger diameter and a shorter length and low speed intake passages each situated on the outer peripheral side of the same and having a smaller diameter and a longer distance, a joint chamber in which the high speed intake passages and the low speed intake passages are jointed to each other, intake ports at the ends of intake manifold portions bifurcated from the joint chamber, the intake ports being arranged one after another along the longitudinal direction of the engine in correspondence to the intake ports on the cylinders, valves disposed at portions between the chamber and the high speed intake passages, each of the valves being cut on both sides thereof at opening portions through which air is induced into the high speed intake passages, and an actuator attached to the chamber to be operatively connected to the valves via a valve actuating mechanism so as to open or close the valves in dependency on the number of revolutions of the engine representing the current operational state of the engine.

Other objects, features and advantages of the present invention will become understood from the following description with reference to the accompanying drawings.

BRIEF DESCRIPTION OF THE DRAWINGS

The present invention is illustrated in the following drawings in which;

FIG. 2 is a perspective view illustrating an intake system in the system in FIG. 1;

FIG. 3 is a fragmentary sectional view of the intake system in FIG. 2;

FIG. 9 is a graph illustrating a relationship of a volumetric efficiency to the number of revolutions of an engine.

DESCRIPTION OF THE PREFERRED EMBODIMENTS

Now, the present invention will be described in detail hereinafter with reference to the accompanying drawings which illustrate preferred embodiments thereof.

Figure 1:
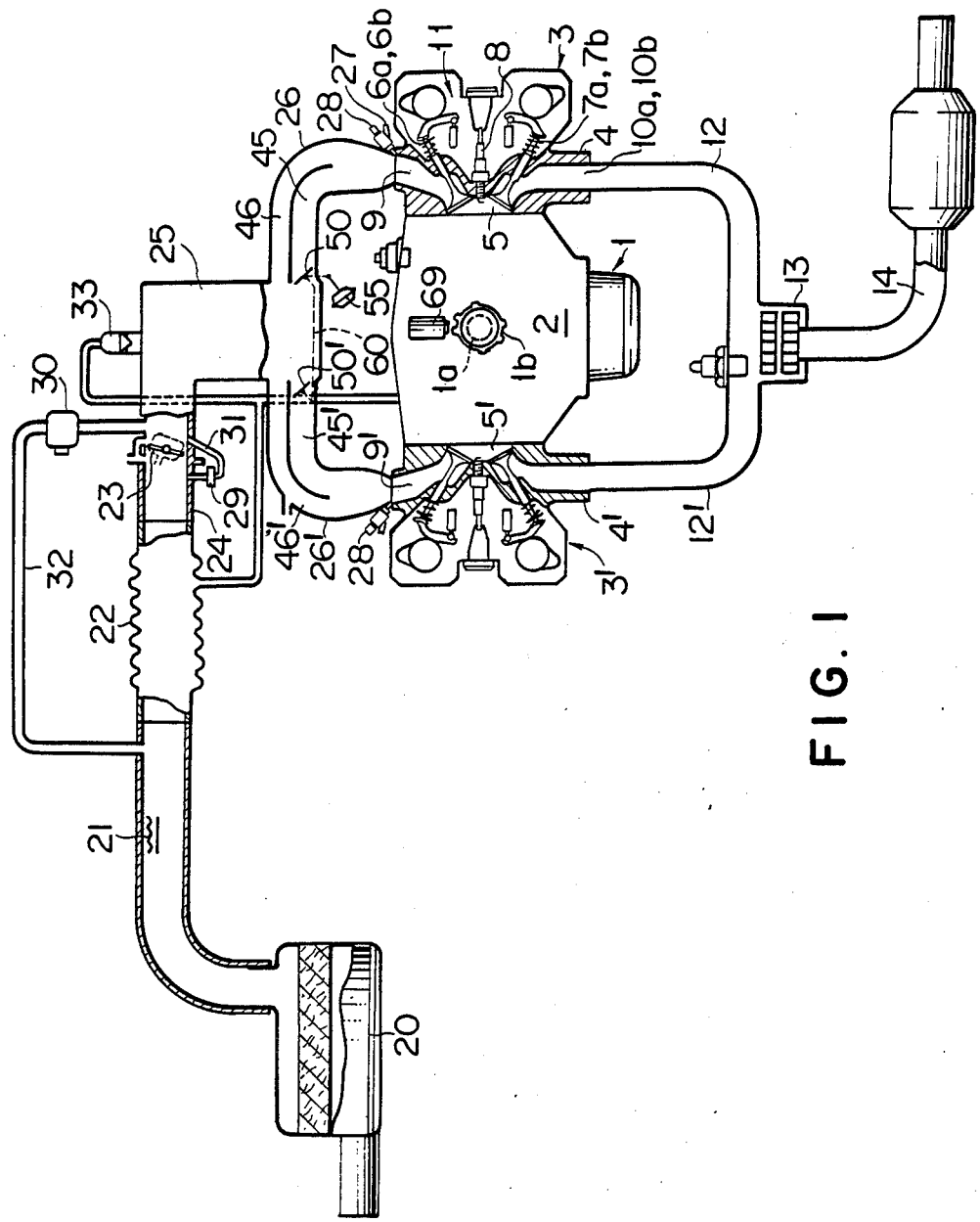
FIG. 1 is a whole view schematically illustrating a system for controlling air intake for an engine for a vehicle in accordance with an embodiment of the present invention.
Figure 4A:
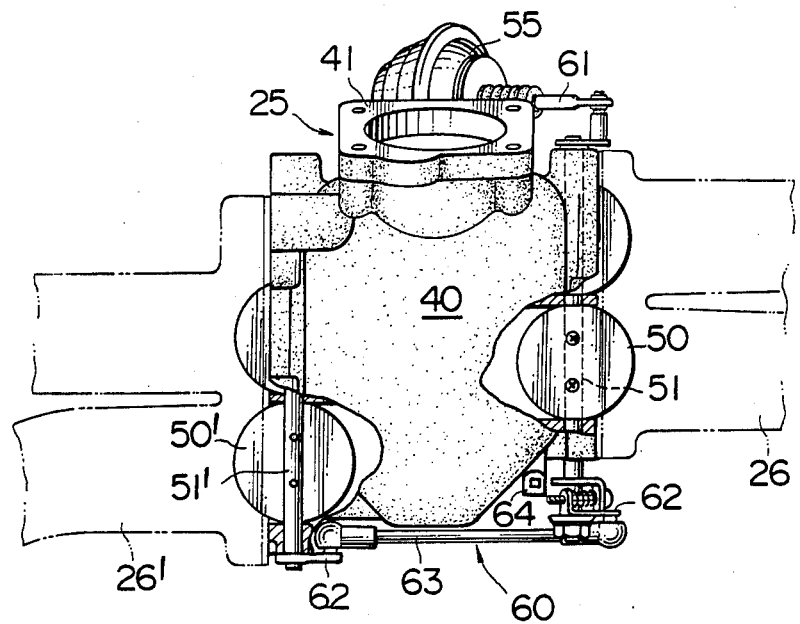
FIG. 4(a) is a fragmentary plan view of the system, particularly illustrating a chamber and intake manifolds.
Figure 4B:
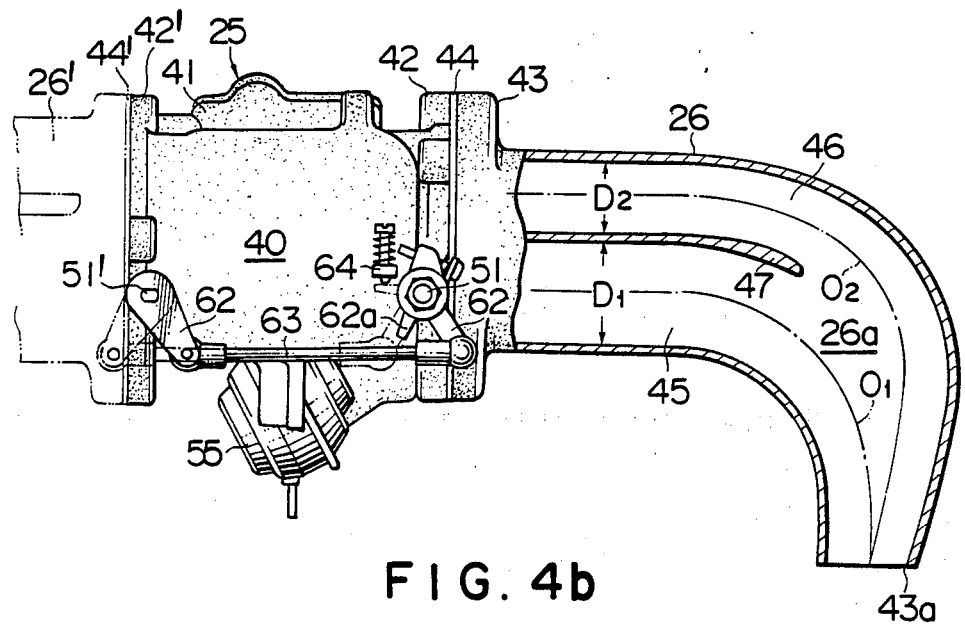
FIG. 4(b) is a partially sectioned front view of the chamber and the intake manifolds in FIG. 4(a)

FIG. 1 is a whole view schematically illustrating a horizontally-opposed type engine to which the present invention is applied. In the drawing, reference numeral 1 generally designates an engine housing. The engine housing 1 includes a crankcase 2 of which right-hand bank 3 has a cylinder head 4 in which a combustion chamber 5 is formed. As shown in FIG. 3, the combustion chamber 5 is equipped with two intake valves 6a and 6b and two exhaust valves 7a and 7b. An ignition plug 8 is disposed at a substantially central part of the combustion chamber 5. The two intake valves 6a and 6b are communicated with a bifurcated intake port 9, whereas the two exhaust valves 7a and 7b are communicated with separate exhaust ports 10a and 10b. The intake valves 6a and 6b and the exhaust valves 7a and 7b are opened and closed by a double overhead cam type valve actuating mechanism 11.

A left-hand bank 3' is constructed in the same manner as mentioned above. On the other hand, combustion chambers 5' for two cylinders are formed in a cylinder head 4' on the left-hand bank 3' in the same manner as those on the right-hand bank 3. Same or similar parts in the drawing as those on the right-hand bank 3 side are represented by same reference numerals each having a prime symbol attached thereto. Accordingly, repeated description will not be required.

Exhaust pipes 12 and 12' extending from the right-hand and the left-hand banks 3, 3' are jointed together under the engine and a catalyst type converter 13 is installed thereon from which a single exhaust pipe 14 extends.

Next, description will be made below as to an intake system.

An air cleaner 20 is communicated via a hot wire type air flow meter 21 and an intake pipe 22 with a throttle body 24 in which a throttle valve 23 is provided. A box-shaped chamber 25 serving to prevent an occurrence of pulsation is coupled downstream of the throttle body 24.

As shown in FIG. 1, the box 25 is arranged at an intermediate position between the right-hand and left-hand banks 3 and 3' above the crankcase 2, and intake manifolds 26 and 26' having same length and bent at substantially right angles relative to the banks 3 and 3' are coupled to the left and right sides of the chamber 25. Each of the intake manifolds 26 and 26 is equipped with an injector fitting portion 27 at the end thereof which comprises an injector 28 so as to inject fuel to the intake port 9, 9'.

Incidentally, the throttle valve 23 is provided with an idle adjusting screw 29 and bypass passages 31 and 32 for an idling control valve 30, and the chamber 25 is provided with a breather valve 33 for gas to be exhausted.

Next, description will be made below as to the chamber 25 and the intake manifolds 26 and 26' with reference to FIGS. 2 to 5.

At the rear part of a housing 40 the chamber 25 includes a flange 41 which is coupled to the throttle body 24. The housing 40 is provided with flanges 42 and 42' on the right and left sides which in turn are coupled to flanges 43 and 43' at the ends of the intake manifolds 26 and 26' via gaskets 44 and 44'.

The right-hand intake manifold 26 is bent in the vertical direction at substantially right angles relative to a horizontal plane and includes shorter high speed intake passages 45 at the lower part thereof, and the high speed intake passages 45 has a larger diameter $D_1$ and extends along a center line $O_1$. Further, it includes longer low speed intake passages 46 at the upper part thereof, the low speed intake passages 46 having a smaller diameter $D_2$ and extending along a center line $O_2$. The both intake passages 45 and 46 are separated from each other by a partition 47 extending from an inlet flange of the intake manifold 26 with a predetermined length so that a joint chamber 26a is formed between an end of the partition 47 and an outlet end 43a of the intake manifold 26.

The housing 40 of the chamber 25 has a right-hand flange 42 which is formed with holes 47 and 48 at the upper and lower parts thereof corresponding to the high speed intake passages 45 and the low speed intake passages 46. The holes 47 and 48 are communicated with each other, and the holes 47 have the same diameter as that of the high speed intake passages 45, while the holes 48 have the same diameter as that of the low speed intake passages 46. A valve 50 is disposed in each hole 47 at the lower part of the flange 42. The other parts are the same as the left-hand intake manifold 26′. Namely, it includes high speed intake passages 45′, low speed intake passages 46′, partitions (not shown) and a joint chamber. A valve 50′ is disposed in the hole 47′ in a left-hand flange 42′ of the chamber 25.

Figure 5:
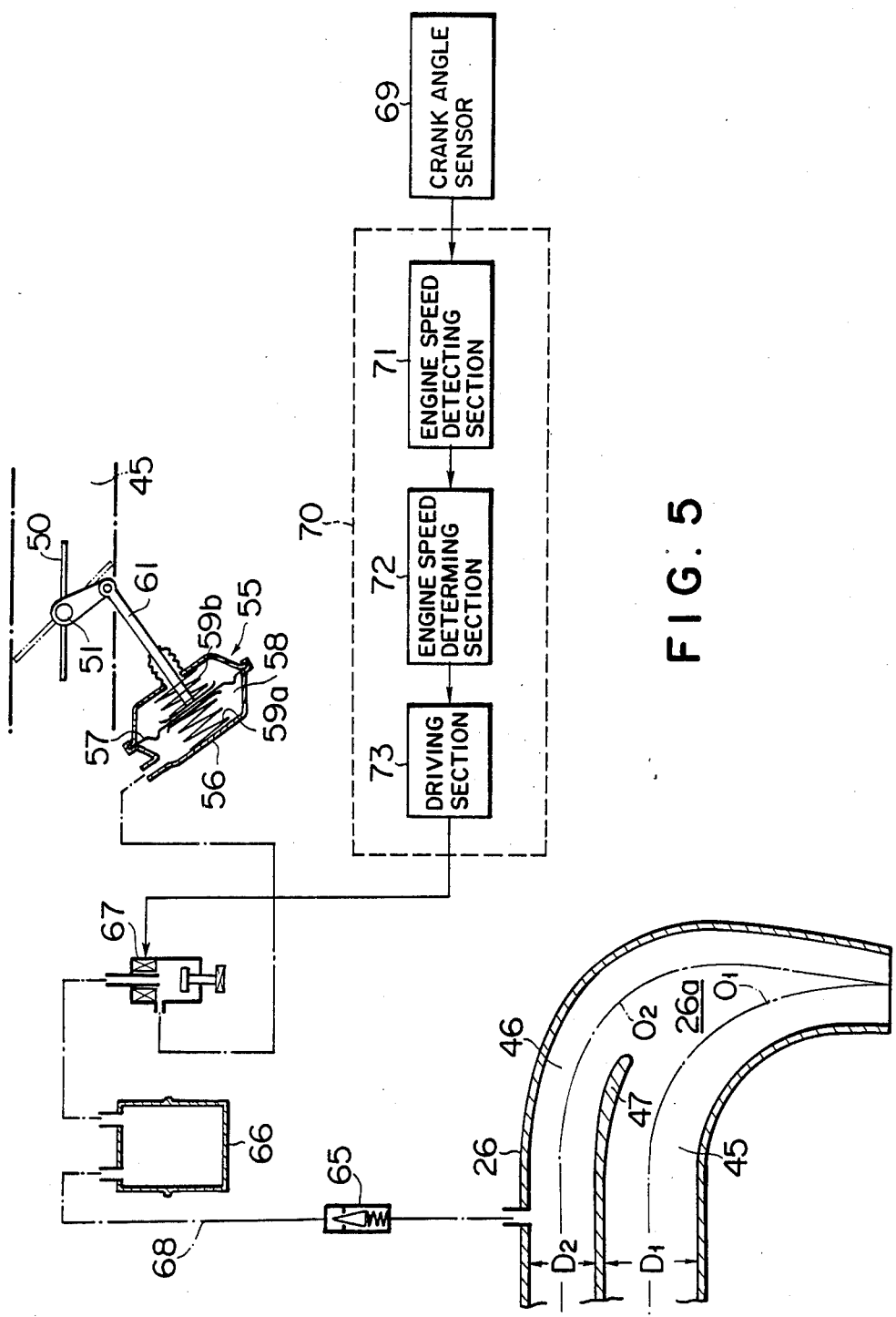
FIG. 5 is a block diagram illustrating a control system for the system.

A diaphragm type actuator 55 is attached to the housing 40 of the chamber 25 on its rear side. As shown in FIG. 5, the actuator 55 comprises a casing 56, a negative pressure chamber defined on one side of a diaphragm 57, a return spring 59a received on the one side of the diaphragm 57 and a spring 59b received on the other side of the same. The actuator 55 is operatively connected to the valves 50 and 50′ via a valve actuating mechanism 60.

The actuating mechanism 60 is such that the diaphragm 57 in the actuator 55 is operatively connected via a link 61 to one end of a valve stem 51 of the valve 50 disposed in the flange 42 of the chamber 25 and the other end of the valve stem 51 is operatively connected via a lever 62 and a rod 63 to a valve stem 51′ of the valve 50′ disposed in the flange 42′. The lever 62 is formed with a projection 62a which abuts against a stopper 64 to determine a fully opened position.

Next, description will be made below with reference to FIG. 5 as to a control system.

The low speed intake passage 46 which is normally in a communicating state to the intake manifold 26 is connected to the negative pressure chamber 58 in the actuator 55 via a check valve 65, a negative pressure tank 66 and a negative pressure passage 68 having a solenoid valve 67 attached thereto. The negative pressure tank 66 is normally loaded with a predetermined negative pressure by means of the check valve 65. The control system includes a crank angle sensor 69 comprising an electromagnetic pickup to detect a crank angle of a crank rotor 1b during rotation of the engine. The crank rotor 1b is fixedly mounted on a crankshaft 1a extending outwardly of the engine housing 1 and has a plurality of projections formed on the periphery thereof to indicate a position representing the current crank angle. An output signal from the sensor 69 is processed in a control unit 70 so that the solenoid valve 67 is actuated in response to the signal.

The control unit 70 includes an engine speed number detecting section 71 for detecting a number N of revolutions of the engine in response to the signal from the crank angle sensor 69 to indicate the current crank angle. The detected number N is compared with a preset value $N_o$, e.g., in the range of 4200 to 4400 rpm, in an engine speed determining section 72. In case where it is found that the number N is equal to $N_o$ or more than $N_o$, the solenoid valve 67 is turned on by means of a driving section 73. But, in case where N is less than $N_o$, it is turned off by means of the driving section 73.

Figure 6:
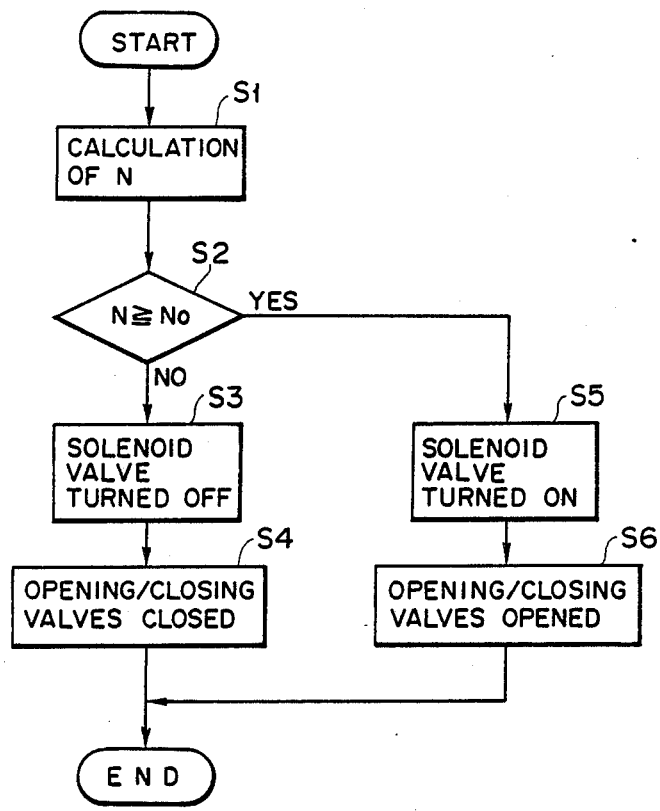
FIG. 6 is a flowchart illustrating functions of the system.

Next, functions of the apparatus of the present invention will be described with reference to a flowchart in FIG. 6.

First, the number N is detected by means of the engine revolution number detecting section 71 in the control unit 70 in response to the signal outputted from the crank angle sensor 69 to indicate the current crank angle during an operation of the engine (step S1). Then, the detected number N of revolutions of the engine is compared with the preset value in the engine speed determining section 72 (step S2). When the engine is rotated at a low or intermediate speed which is represented by a relationship between the number N of revolutions of the engine and the preset value $N_o$ in the form of $N < N_o$, the solenoid valve 67 is turned off (step S3). Then, a negative pressure in the negative pressure tank 66 is introduced into the negative pressure chamber in the actuator 55, whereby the link 61 is pulled by the diaphragm 57. Thereafter, the valve stem 51 rotates in one direction to close the valve 50 (step S4). This rotation of the valve stem 51 is transmitted to the other valve stem 51′ via the lever 62 and the rod 63 so that the valve 50′ is also closed. In this manner, the both left-hand and right-hand valves 50 and 50′ are fully closed and thereby the high speed intake passages 45 and 45′ are shut off. Consequently, an air which has flowed in the chamber 25 via the throttle valve 23 is induced into the intake ports 9 on the left-hand and right-hand banks 3 and 3 via the low speed intake passages 46 and 46′ only and it is then fed to combustion chambers 5 and 5′ together with fuel injected through the injectors 28. In this case, an intake air speed is increased by the small diameter of the low speed intake passages 46 and 46′, an intake inertia effect is developed so as to induce air at a high efficiency and a mixture of air and fuel is burnt efficiently.

When the engine is operated at an intermediate speed, the system is effective for preventing an intake air in the joint chamber 26a from flowing at an excessively high speed and from feeding a comparatively large quantity of air in a stable manner, in which the high speed intake passages 45, 45′ are jointed to the low speed intake passages 46, 46′.

On the other hand, when the engine is operated at a high speed, i.e., $N \geq N_o$, the solenoid valve 67 is turned on (step S5). Consequently, the negative chamber 58 in the actuator 55 is exposed to the atmosphere. The link 61 is moved outwardly by the diaphragm 55 so that the valves 50 and 50′ are returned to the initial fully opened position via the valve stems 51 and 51′ (step S6). As a result, the high speed intake passages 45 and 45′ are in a communicating state. In this case, a large quantity of air is fed to the engine because of reduced resistance against air induction by the both high speed intake passages 45 and 45′ and the low speed intake passages 46 and 46′, resulting in an increased output power of the engine being assured.

Next, another embodiment of the present invention modified from the embodiment as shown in FIGS. 1 to 6 will be described below with reference to FIGS. 7 to 10.

The same parts or components as those in the preceding embodiment are represented by same reference numerals.

Figure 7:
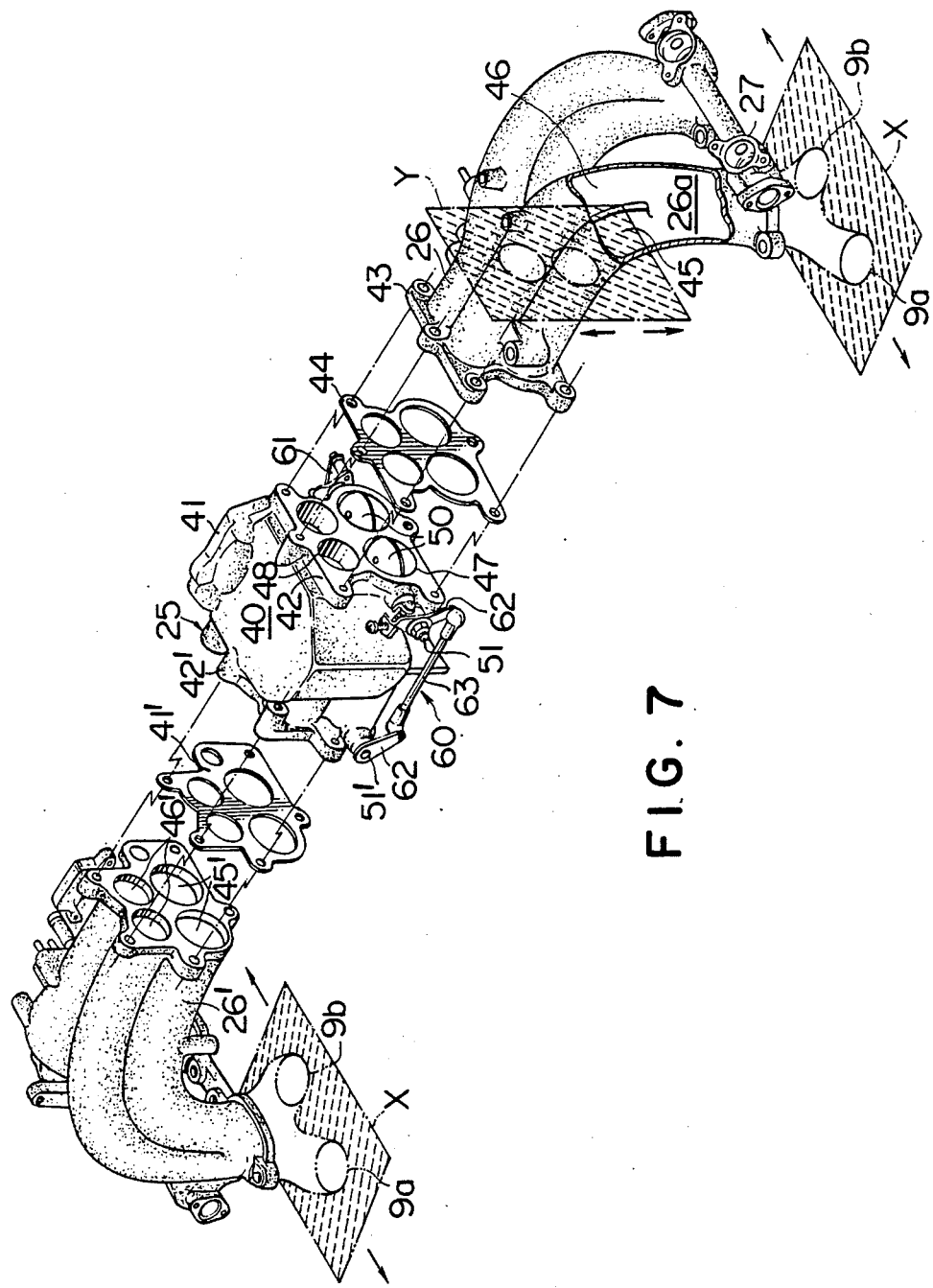
FIG. 7 is a perspective view similar to FIG. 2 illustrating the system in accordance with a modified embodiment of the present invention.

The modified embodiment consists of the ends 9a and 9b of each bifurcated intake manifold portions which are arranged one after another as seen in the longitudinal direction of the engine housing 1 in a horizontal plane X which extends at right angles relative to a vertical plane Y in FIG. 7.

Another characterizing feature of the modified embodiment provides each of the valves 50 and 50' disposed in the high speed intake passages 45 and 45' which is formed with cutouts (chamfers) 50a on both sides thereof to provide opening portions 50b through which a predetermined quantity of intake air is normally induced into the respective high speed intake passages 45 and 45'.

According to the modified embodiment, the ends of each bifurcated intake manifold portions are arranged one after another in the longitudinal direction of an engine, as shown in FIG. 7. Consequently, a high volumetric efficiency can be obtained in all engine operational range.

Figure 8:
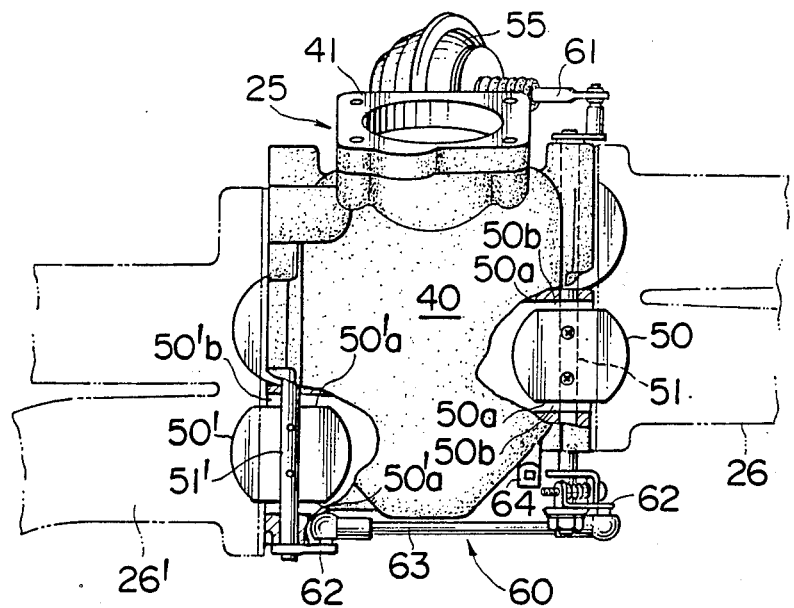
FIG. 8 is a fragmentary plan view similar to FIG. 4(a), particularly illustrating valves in high speed intake passages.

Further, according to the modified embodiment, when the engine is operated at the low or intermediate speed with the valves 50 and 50' kept fully closed, an air which has flowed in the chamber 25 via the throttle valve 23 is induced into the intake ports 9 and 9' also via the low speed intake passages 46 and 46' and the opening portions 50b and 50b' in the high speed intake passages 45 and 45' (see FIG. 8). Consequently, a volumetric efficiency can be improved in a low or intermediate operational range.

FIG. 9 is a graph which illustrates a relationship of a volumetric efficiency to the number of revolutions of an engine as an opening area of the opening portions 50b, 50b. varies with the valve 50, 50' in the high speed intake passage 45 kept fully closed. As shown in the graph, the volumetric efficiency does not vary so much due to variation of the opening area of the opening portion 50b, 50b' at the number of revolutions of an engine in the range of 1000 to 2000 rpm but it varies to a high point at an engine speed of about 4000 rpm.

Figure 10:
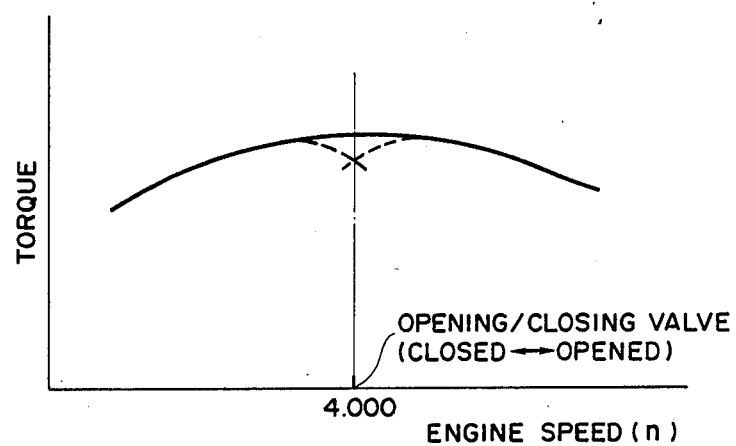
FIG. 10 is a graph illustrating a relationship of torque to the number of revolutions of an engine.

FIG. 10 is a graph which illustrates a relationship of a torque to the engine speed. In case where the valve 50, 50' disposed in the high speed intake passage 45, 45' has no opening portion, a torque-down occurs as indicated by dotted lines. To the contrary, in case where the valve 50, 50' is formed with the opening portions 50b, 50b. on both sides thereof of which area is adequately determined, no torque-down occurs as indicated by a solid line in the graph. As shown in the drawing, a characteristic representing a variation of the torque indicates smooth curve. Thus, an occurrence of the torque-down is avoided at an engine speed of about 4000 rpm, i.e., at the time when the valves 50, 50' are shifted from a closed state to an opened state (resulting in a volumetric efficiency being improved). A maximum torque is generated at an engine speed of near 4000 rpm.

According to the present invention, the high speed intake passages and low speed intake passages are arranged in such a way that the system for controlling of air intake is simple in structure and easily manufactured at an inexpensive cost. With this apparatus, preheating is easily effected for intake air. A high volumetric efficiency can be obtained in all engine operational regions. No torque-down occurs when the valves are shifted from the closed state to the opened state and vice versa. The characteristic representing the variation of the torque indicate smooth curve.

While the present invention has been described above with respect to the horizontally-opposed type engine, it should be noted that the present invention should not be limited only to this but it may be applied to a V-shaped engine with the same advantageous effects as those derived from the horizontal opposed type engine.

Further, while the presently preferred embodiments of the present invention have been shown and described, it should of course be understood that the disclosures are for the purpose of illustration and that various changes or modifications may be made without departure from the scope of the invention as defined in the appended claims.

What is claimed is:

1. In system for controlling air intake for an engine of a vehicle wherein a cylinder head has a left-hand bank and a right-hand bank, and a chamber arranged downstream of a throttle valve at a substantially intermediate position between said two banks so that it is communicated with respective cylinders on both banks via intake manifolds extending from left and right sides of said chamber to intake ports of said cylinders, said intake manifolds being curved at right angles between a vertical plane and a horizontal plane, the improvement comprising;
    a high speed intake passage situated on an inner peripheral side of each of intake manifolds and having a larger diameter and a shorter length, and a low speed intake passage situated on an outer peripheral side of each of intake manifolds and having a smaller diameter and a longer distance;
    a respective joint chamber in which said high speed intake passage and said low speed intake passage are jointed to each other;
    a respective control valve disposed between said chamber and each of said high speed intake passages; and
    an actuator operatively actuating said control valves via a valve actuating mechanism so as to open or close said control valves.

2. The system as claimed in claim 1, wherein in each said manifold said high speed intake passage and said low speed intake passage are separated from each other by a partition extending from an inlet flange of the intake manifold to said joint chamber.

3. The system as claimed in claim 1, wherein said actuator includes a negative pressure chamber which is communicated with a negative pressure generator so as to actuate said negative pressure chamber via a control unit having a crank angle sensor to detect a rotational speed of a crankshaft of the engine so that said actuator is controlled in dependency on the engine speed.

4. The system as claimed in claim 3, wherein said negative pressure generator is communicated with the low speed intake passage via a check valve.

5. The system as claimed in claim 4, wherein said control unit includes an engine speed determining section so as to open or close the valve in response to a detected current engine speed representing a current operational state of the engine.

6. In a system for controlling air intake for an engine of a vehicle wherein a cylinder head has a left-hand bank and a right-hand bank, and a chamber arranged downstream of a throttle valve at a substantially intermediate position between said two banks so that it is communicated with respective cylinders on both banks via intake manifolds extending from left and right sides of said chamber to intake ports of said cylinders, said intake manifolds being curved at right angles between a vertical plane and a horizontal plane, the improvement comprising;
    a high speed intake passage situated on an inner peripheral side of the intake manifolds and having a larger diameter and a shorter length, and a low speed intake passage situated on an outer peripheral side of the intake manifolds and having a smaller diameter and a longer distance a respective joint chamber in which said high speed intake passage and said low speed intake passage are jointed to each other;

an intake port at an end of each said joint chamber and arranged one after another along a longitudinal direction of the engine in correspondence to the cylinders;

a respective control valve disposed between said chamber and each of said high speed intake passages; and an actuator operatively actuating said control valves via a valve actuating mechanism so as to open or close said control valves.

7. In a system for controlling air intake for an engine of a vehicle wherein a cylinder head has a left-hand bank and a right-hand bank, and a chamber arranged downstream of a throttle valve at a substantially intermediate position between said two banks so that it is communicated with respective cylinders on both banks via intake manifolds extending from left and right sides of said chamber to intake ports on said cylinders, said intake manifolds being curved by right angles between a horizontal plane and a vertical plane, the improvement comprising;

a high speed intake passage situated on an inner peripheral side of the intake manifolds and having a larger diameter and a shorter length, and a low speed intake passage situated on an outer peripheral side of the intake manifolds and having a smaller diameter and a longer distance;

a respective joint chamber in which said high speed intake passage and said low speed intake passage are jointed to each other;

an intake port at an end of each said joint chamber and arranged one after another along a longitudinal direction of the engine in correspondence to the cylinders;

a respective control valve disposed between said chamber and each of said high speed intake passages, said valve being formed with a cutout (a chamfer) on both sides thereof through which intake air is induced into the high speed intake passage; and an actuator for operatively actuating said control valves via a valve actuating mechanism so as to open or close said control valves.

* * * * *